United States Patent
Yasuda

(10) Patent No.: US 7,529,298 B2
(45) Date of Patent: May 5, 2009

(54) PICTURE TRANSMISSION METHOD, PICTURE TRANSMISSION METHOD PROGRAM, STORAGE MEDIUM WHICH STORES PICTURE TRANSMISSION METHOD PROGRAM, AND PICTURE TRANSMISSION APPARATUS

(75) Inventor: Hiroyuki Yasuda, Saitama (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 10/133,420

(22) Filed: Apr. 29, 2002

(65) Prior Publication Data

US 2002/0168006 A1 Nov. 14, 2002

(30) Foreign Application Priority Data

May 1, 2001 (JP) ............... 2001-133770

(51) Int. Cl.
*H04B 1/66* (2006.01)
(52) U.S. Cl. .............. 375/240.01; 375/240.24; 375/240.26; 375/240.02; 348/14.12; 348/14.03; 348/14.02; 725/101; 725/98; 725/87
(58) Field of Classification Search ........... 375/240.02, 375/240.01, 240.25, 240.26, 240.24, 240.1; 348/561, 576, 581, 14.12, 14.03, 14.02; 382/282, 382/239, 243; 725/101, 98, 87
See application file for complete search history.

(56) References Cited

U.S. PATENT DOCUMENTS

| 6,018,359 | A | * | 1/2000 | Kermode et al. ............ 725/101 |
| 6,078,349 | A |   | 6/2000 | Molloy |
| 6,178,204 | B1 |   | 1/2001 | Hazra |
| 6,476,873 | B1 | * | 11/2002 | Maeng ..................... 348/561 |
| 6,496,607 | B1 | * | 12/2002 | Krishnamurthy et al. .... 382/282 |
| 6,536,043 | B1 | * | 3/2003 | Guedalia .................... 725/90 |

FOREIGN PATENT DOCUMENTS

| WO | WO 99/22518 | 5/1999 |
| WO | WO 01/50754 | 7/2001 |

OTHER PUBLICATIONS

R. P. Schumeyer, et al., IEEE, Multimedia Signal Processing, XP-010233877, pp. 531-536, "Region of Interest Priority Coding for Sign Language Videoconferencing", Jun. 23-25, 1997.

* cited by examiner

*Primary Examiner*—Shawn An
(74) *Attorney, Agent, or Firm*—Oblon, Spivak, McClelland, Maier & Neustadt, P.C.

(57) ABSTRACT

A picture transmission method is disclosed which involves encoding moving picture data and transmitting the encoded data. The picture transmission method includes the steps of encoding firstly the moving picture data into a moving picture stream for transmission at a predetermined data transfer rate, and encoding secondly, based on position information acquired from a transmission destination, a part of the moving picture data which constitutes a partial picture region for transmission at a higher resolution than the first encoding step.

7 Claims, 4 Drawing Sheets

PICTURE TRANSMISSION METHOD, PICTURE TRANSMISSION METHOD PROGRAM, STORAGE MEDIUM WHICH STORES PICTURE TRANSMISSION METHOD PROGRAM, AND PICTURE TRANSMISSION APPARATUS

BACKGROUND OF THE INVENTION

The present invention relates to a picture transmission method, a picture transmission method program, a storage medium which stores the picture transmission method program, and a picture transmission apparatus. More particularly, the invention relates to techniques for distributing a moving picture stream over a network. According to the invention, picture data as a whole are first transmitted when compressed at a high compression rate. Based on position information acquired from a given transmission destination, part of the picture data representing a partial picture region is transmitted at a higher resolution than the remaining regions. That is, a user-designated partial region of each picture is compressed at a reduced data compression rate for a moving picture streaming service, so that users may watch desired portions of the streaming moving pictures reproduced at a higher resolution.

Conventionally, moving picture streams are distributed over a network such as the Internet using a real-time compression and transmission system such as MPEG4 (Moving Picture Experts Group Phase 4).

MPEG4 represents techniques for efficiently compressing moving picture data through the effective use of correlations between continuous pictures. Where moving picture data streams are distributed using MPEG4, the data compression rate is varied depending on the current amount of encoded data so that the data may be transmitted at a bit rate commensurate with the capacity of communication lines being used.

With such a real-time compression and transmission system in use, higher data compression rates necessarily increase the amount of the data dropped from the original moving picture data and a transmission destination may not be able to reproduce clear pictures (i.e. pictures of high qualities). On the other hand, reduced data compression rates eventually make it impossible to transmit moving picture data over communication lines that have limited capacities.

One proposed solution (ROI) to the above problem involves reducing the data compression rate for only a specific region of each moving picture. In other words, only that part of each picture which users are presumably desirous of watching at higher quality is transmitted at higher resolution while the remaining portions which users do not need in detailed picture, such as background, are left to have lower quality. The conventional solution is supposed efficiently to transmit moving picture data over communication lines subject to limited capacities.

One disadvantage of the solution above is that the specific region of each picture selected for the high-resolution transmission may differ from the one that is desired by a user. Different users have different preferences. In a football game broadcast, for example, some users may look for a detailed picture of a particular player on defense side while other users may prefer watching a high-resolution image of another player on offence side.

Transmitting picture portions that are not desired by a user at high resolution may be wasteful. Under the conventional scheme, a number of users may miss high-quality images of their preference.

As outlined above, if only a fixed region of each picture is compressed at a reduced data compression rate for higher-quality distribution over the network by a moving picture streaming service, some users are satisfied but others are not. The conventional method has failed to address the diverse user preferences where pictures are transmitted on a partial-region enhanced-quality basis.

The present invention has been made in view of the above circumstances and provides a picture transmission method, a picture transmission method program, a storage medium which stores the picture transmission method program, and a picture transmission apparatus for adequately addressing user preferences so that a user-designated specific region of each picture is compressed at a lower data compression rate for higher-resolution distribution through a moving picture streaming service.

SUMMARY OF THE INVENTION

According to the first aspect of the present invention, there is provided a picture transmission method for encoding moving picture data and transmitting the encoded data, the method comprising the steps of:

encoding firstly said moving picture data into a moving picture stream for transmission at a predetermined data transfer rate; and encoding secondly, based on position information acquired from a transmission destination, a part of said moving picture data which constitutes a partial picture region for transmission at a higher resolution than said first encoding step.

According to the second aspect of the present invention, there is provided a picture transmission method program for encoding moving picture data and transmitting the encoded data, the program comprising the steps of:

encoding firstly said moving picture data into a moving picture stream for transmission at a predetermined data transfer rate; and encoding secondly, based on position information acquired from a transmission destination, a part of said moving picture data which constitutes a partial picture region for transmission at a higher resolution than said first encoding step.

According to the third aspect of the present invention, there is provided a storage medium which stores a picture transmission method program for encoding moving picture data and transmitting the encoded data, the program comprising the steps of:

encoding firstly said moving picture data into a moving picture stream for transmission at a predetermined data transfer rate; and encoding secondly, based on position information acquired from a transmission destination, a part of said moving picture data which constitutes a partial picture region for transmission at a higher resolution than said first encoding step.

According to the fourth aspect of the present invention, there is provided a picture transmission apparatus for encoding moving picture data and transmitting the encoded data, the apparatus comprising:

first encoding means for encoding said moving picture data into a moving picture stream for transmission at a predetermined data transfer rate; and second encoding means which, based on position information acquired from a transmission destination, encodes a part of said moving picture data which constitutes a partial picture region for transmission at a higher resolution than said first encoding means.

DETAILED DESCRIPTION OF THE PREFERRED EMBODIMENTS

Preferred embodiments of this invention will now be described in detail with reference to the accompanying drawings.

(1) First Embodiment (1-1) Structure of the First Embodiment

Figure 1:
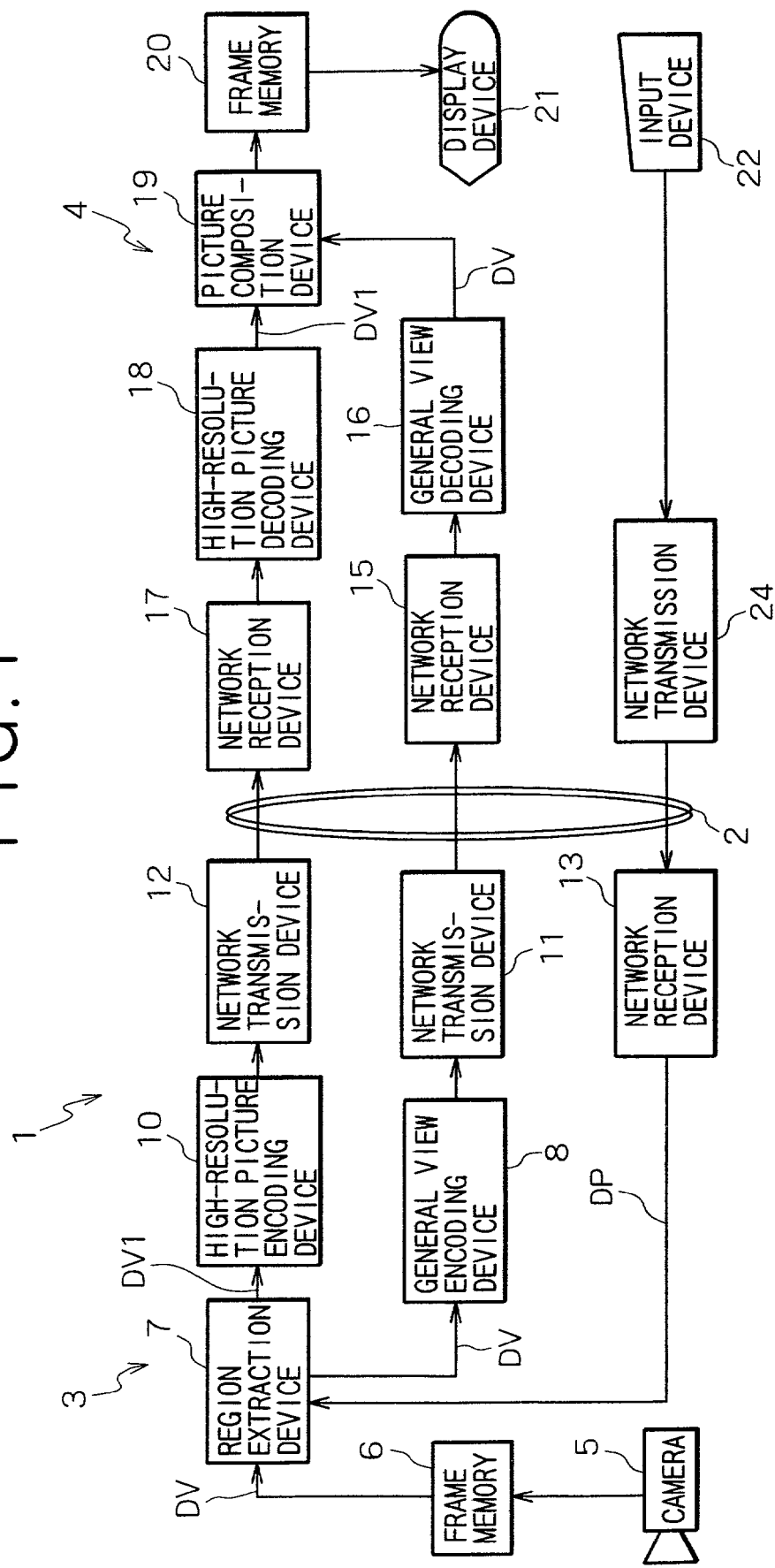
FIG. 1 is a block diagram of a moving picture distribution system practiced as a first embodiment of the present invention.

FIG. 1 is a block diagram of a moving picture distribution system 1 practiced as the first embodiment of this invention. In the moving picture distribution system 1, a transmitting side 3 transmits a moving picture stream over a network 2 such as the Internet for reception by a receiving side 4.

On the transmitting side 3, a camera 5 takes pictures of a desired object and outputs video data DV constituting moving pictures. A frame memory 6 holds the video data DV temporarily before output.

Figure 2:
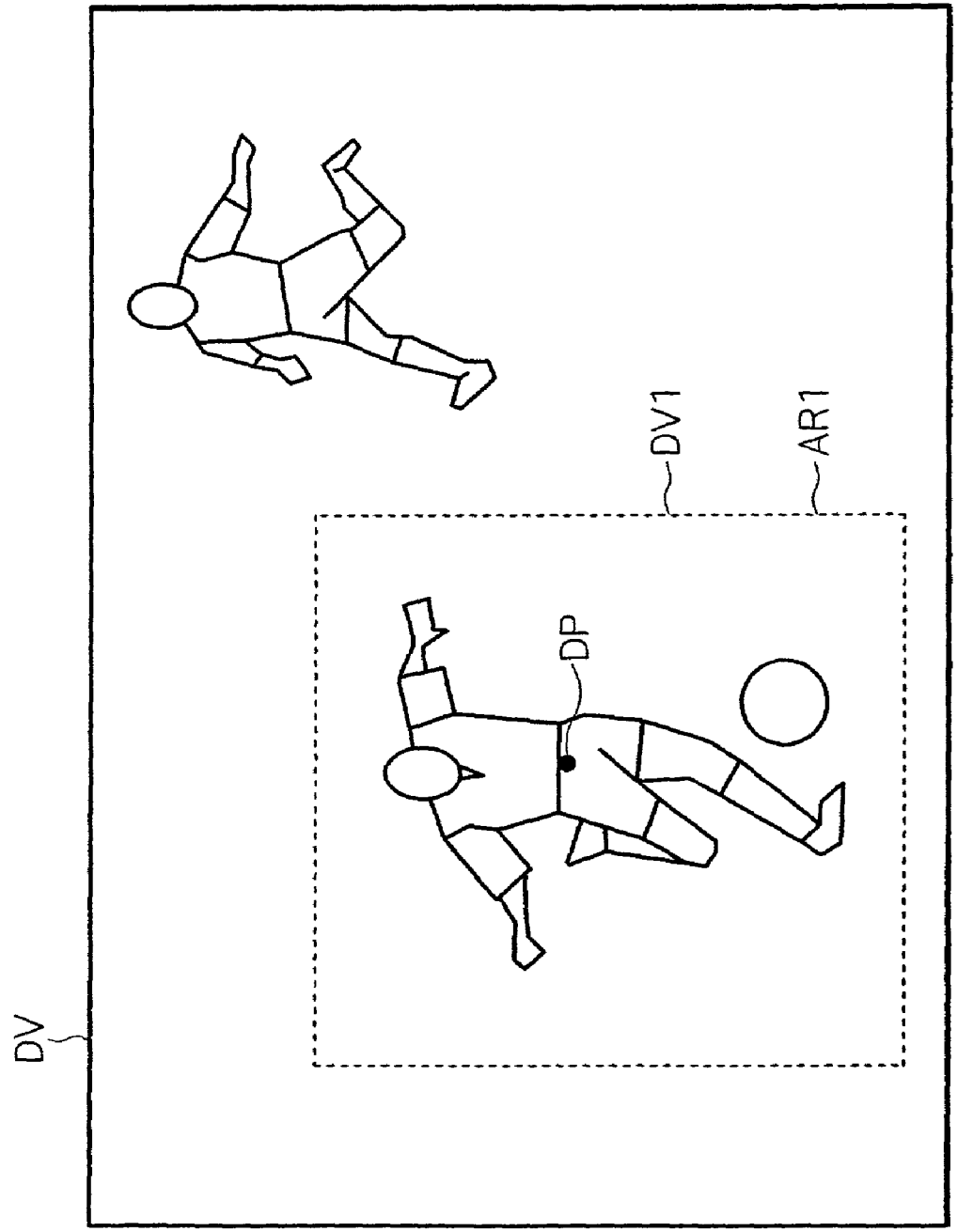
FIG. 2 is a plan view showing relations between the overall view of a picture and a specific region of that picture having a higher resolution than the rest of the picture as displayed by the system of FIG. 1.

A region extraction device 7 forwards the video data DV unmodified from the frame memory 6 to a general view encoding device 8. The region extraction device 7 may then be notified of position information DP, as shown in FIG. 2, from a network reception device 13 regarding the video data DV destined for the general view encoding device 8. In that case, the region extraction device 7 establishes a partial picture region AR1 based on the position information DP and outputs video data DV1 constituting the partial region AR1 to a high-resolution picture encoding device 10.

The position information DP is information which denotes the display position selected by a user on the receiving side 4 within the general view constituted by the video data DV. When thus designated, the position information DP is transmitted from the receiving side 4 in response to the user's operation. Given the position information DP, the region extraction device 7 establishes the partial region AR1 extending in the horizontal and perpendicular directions from a position designated by the position information DP as a center point of a picture portion, before outputting the video data DV1 constituting the partial region AR1 to the high-resolution picture encoding device 10.

When notified of the position information DP from the network reception device 13, the region extraction device 7 keeps outputting to the high-resolution picture encoding device 10 the video data DV1 about the partial region AR1 for a predetermined period of time measured by an internal timer. When the predetermined time period has elapsed, the region extraction device 7 stops sending the video data DV1 to the high-resolution picture encoding device 10.

Based illustratively on MPEG4, the general view encoding device 8 compresses the video data DV from the region extraction device 7 at a relatively high data compression rate prior to output. The output data from the general view encoding device 8 are placed by a network transmission device 11 onto the network 2. In this manner, the transmitting side 3 distributes all video data DV obtained from the camera 5 over the network 2 after having the data compressed at a relatively high data compression rate.

Using the same predictive coding scheme as the general view encoding device 8, the high-resolution picture encoding device 10 compresses the partial region video data DV1 from the region extraction device 7 prior to output. During the compression process, the high-resolution picture encoding device 10 compresses the video data DV1 at a lower data compression rate than the general view encoding device 8 for output. That is, the high-resolution picture encoding device 10 outputs encoded moving picture data at a higher resolution than the general view encoding device 8 outputting its moving picture stream.

A network transmission device 12 places the output data from the high-resolution picture encoding device 10 onto the network 2. Based on the position information DP, the transmitting side 3 transmits the selected part of the video data DV from the camera 5 at a higher resolution than the rest of the video data DV.

The network reception device 13 acquires the position information DP from the receiving side 4 and forwards the acquired information to the region extraction device 7. Accordingly, the region extraction device 7 in the moving picture distribution system 1 transmits the general view video data DV at the higher data compression rate while feeding the video data DV1 representing the partial picture region designated by the receiving side 4 at the higher resolution.

On the receiving side 4, a network reception device 15 receives the moving picture stream from the network transmission device 11 and forwards what is received to downstream devices. A general view decoding device 16 decodes the video data DV out of the moving picture stream coming from the network reception device 15, before outputting the decoded video data DV.

Another network reception device 17 on the receiving side 4 receives the moving picture stream coming from the network transmission device 12 and forwards what is received to downstream devices. A high-resolution picture decoding device 18 decodes the video data DV1 out of the moving picture stream coming from the network reception device 17, before outputting the decoded video data DV1.

A picture composition device 19 substitutes the video data DV1 from the high-resolution picture decoding device 18 for part of the video data DV from the general view decoding device 16 before outputting the composite video data to a frame memory 20. The frame memory 20 temporarily retains the output data from the picture composition device 19 before outputting the data to a display device 21. The display device 21 displays the data from the frame memory 20.

An input device 22 is composed of two-dimensional coordinate inputting means such as a mouse. The input device 22, when operated by the user, moves a cursor on a display screen of the display device 21. The input device 22, when further operated by the user, outputs coordinates DP of a specific display position on the display device 21. The output coordinate information DP is sent by a network transmission device 24 over the network 2 to the transmitting side 3.

(1-2) How the First Embodiment Works

In the moving picture distribution system 1 of the above constitution (FIG. 1), the video data DV acquired by the camera 5 are input to the general view encoding device 8 for data compression into the moving picture stream. After the compression, the moving picture stream is transmitted over the network 2 to the receiving side 4. On the receiving side 4, the general view decoding device 16 decodes the original video data DV out of the received stream. Given the decoded video data DV, the display device 21 displays moving pictures reflecting the data.

The moving picture distribution system 1 thus allows moving pictures taken by the camera 5 to be viewed on the display device 21. Because the moving picture stream thus transmitted has been compressed by the general view encoding device 8 at a high data compression rate, the stream lacks detailed information and has the correspondingly lower picture quality than the original video data DV when displayed.

If a user wants a specific part of the general view to be displayed in more detail, the user operates the input device 22 to designate that part on the screen of the display device 21. In turn, the position information DP about the designated part is reported to the transmitting side 3 (FIG. 2). The report causes the transmitting side 3 to locate the partial picture region AR1. The video data DV1 constituting the region AR1 are output by the region extraction device 7 to the high-resolution encoding device 10. The encoding device 10 compresses the video data DV1 on the user-designated region at a lower data compression rate than the general view video data DV for the moving picture stream. The moving picture stream from the lower-rate compression is sent to and decoded by the receiving side 4. The high-resolution moving pictures substitute for part of the general view constituted by the video data DV.

As described, the first embodiment permits users to view a desired partial region of the picture at higher resolution than the remaining regions. The feature is particularly useful in applications such as the moving picture streaming service wherein only a user-designated specific portion of each picture is distributed at the reduced data compression rate to the user in question. Thus different users can enjoy their preferred portions of the moving picture stream at the higher picture quality than the remaining picture portions.

In such a moving picture bit streaming application, it is possible that a target which a user wishes to view in detail may move out of the user-designated partial region AR1 as time elapses, since the target is constantly moving in the moving picture. When that eventuality is taken into account, the position information DP may be reported from the receiving side 4 together with time frame information. In that case, the transmitting side 3 transmits the high-resolution moving picture stream during that time frame and stops sending the stream once that time frame has elapsed. In this manner, the inventive moving picture distribution system 1 effectively averts wasteful transmission of the video data that are no longer desired.

Figure 3:
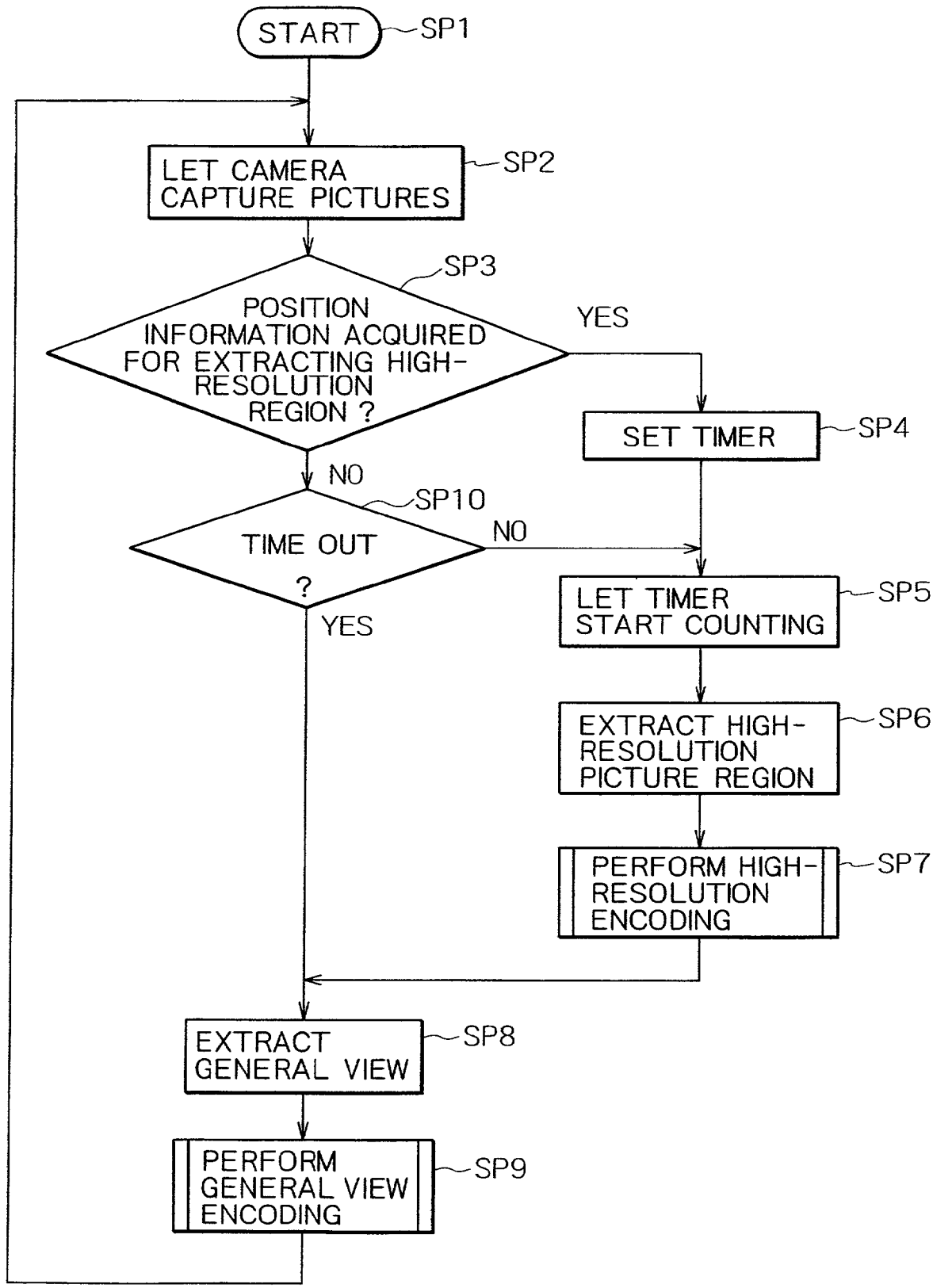
FIG. 3 is a flowchart of steps performed by the transmitting side in the moving picture distribution system of FIG. 1.

FIG. 3 is a flowchart of steps performed by the transmitting side 3. Following the start of moving picture distribution in step SP1, the transmitting side 3 goes to step SP2. In step SP2, the transmitting side 3 causes the camera 5 to capture moving pictures to be transmitted. In step SP3, a check is made to see if position information DP is acquired by the network reception device 13. If the position information DP is judged acquired, that means a partial picture region needs to be extracted for higher-resolution transmission.

If in step SP3 the position information DP is judged acquired, step SP4 is reached in which a timer is set on the region extraction device 7. In step SP5, the timer starts counting. In step SP6, the position information DP is used as a basis for extracting video data DV1 representing a partial picture region AR1. In step SP7, the extracted video data DV1 are encoded by the high-resolution picture encoding device 10. In step SP8, general view video data DV corresponding to a whole picture are fed to the general view encoding device 8. In step SP9, the video data DV are encoded. After transmitting two sets of moving picture stream to the receiving side 4, the transmitting side 3 goes back to step SP2 to process another picture.

If in step SP3 the position information DP is not judged acquired, the transmitting side 3 goes to step SP10. In step SP10, a check is made to see if a predetermined period of time has elapsed on the timer started in step SP5 since the start of a high-resolution moving picture stream. If in step SP10 the predetermined time period is not judged to have elapsed, then step SP5 is reached. In this case, too, the high-resolution moving picture stream is transmitted.

If in step SP10 the predetermined time period is judged to have elapsed, the transmitting side 3 goes to step SP8. In step SP8, only the general view moving picture stream is output by the general view encoding device 8 and the high-resolution moving picture stream is suppressed.

(1-3) Effects of the First Embodiment

The first embodiment of the above-described constitution outputs general view video data at a high data compression rate while transmitting a partial picture region at a high resolution in accordance with position information acquired from a transmission destination. When a particular portion of each picture is thus designated by individual users for transmission at the reduced data compression rate (i.e., at high resolution) in the moving picture streaming service, user preferences are adequately addressed.

(2) Second Embodiment

Figure 4:
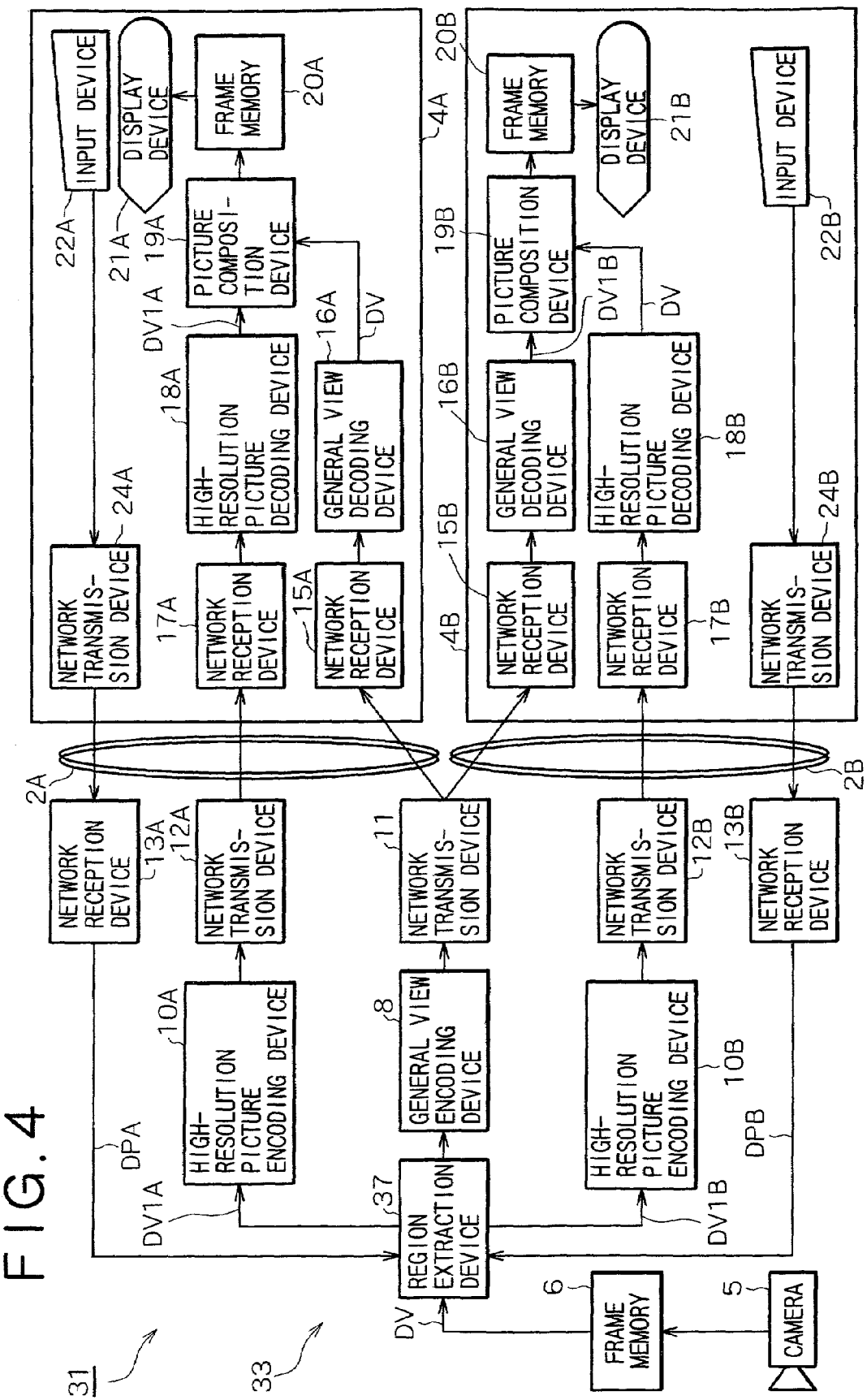
FIG. 4 is a block diagram of a moving picture distribution system practiced as a second embodiment of the present invention.

FIG. 4 is a block diagram of a moving picture distribution system 31 practiced as the second embodiment of this invention. The moving picture distribution system 31 distributes moving pictures to a plurality of destinations. In the moving picture distribution system 31 of FIG. 4, the component parts with their functionally identical or equivalent counterparts already indicated in the moving picture distribution system 1 of FIG. 1 are designated by like reference numerals, and their descriptions are omitted where redundant.

In the moving picture distribution system 31, a transmitting side 33 causes a general view encoding device 8 to transmit a moving picture stream commonly to receiving sides 4A and 4B which are transmission destinations. More specifically, the transmitting side 33 first directs video data DV from a frame memory 6 through a region extraction device 37 to the general view encoding device 8. The encoding device 8 encodes the video data DV into a moving picture stream at a high data compression rate and transmits the encoded stream to the receiving sides 4A and 4B via a network transmission device 11.

The transmitting side 33 allows network reception devices 13A and 13B to acquire position information DPA and DPB respectively from the receiving sides. Given the two sets of position information, the region extraction device 37 establishes partial picture regions correspondingly and outputs video data DV1A and DV1B representing the established picture regions.

On the transmitting side 33, the video data DV1A and DV1B are encoded respectively by high-resolution picture encoding devices 10A and 10B generating high-resolution moving picture streams destined for the receiving sides. The two streams are output to the relevant receiving sides 4A and 4B.

The receiving sides 4A and 4B commonly receive the moving picture stream from the general view encoding device 8 and decode the video data DV therefrom. Furthermore, the receiving sides 4A and 4B receive the individually transmitted high-resolution moving picture streams and decode the image data DV1A and DV1B therefrom. When thus decoded, the general view moving picture stream and each of the high-resolution moving picture streams are composed by picture composition devices 19A and 19B. The composed video data are reproduced by display devices 21A and 21B. Viewing reproduced pictures on the display devices 21A and 21B, users may operate input devices 22A and 22B to send position information DPA and DPB to the transmitting side 33.

In transmitting moving pictures to a plurality of destinations, the second embodiment shown in FIG. 4 sends to each destination the general view video data at the high data compression rate while feeding partial picture region data at the reduced data compression rate for high-resolution transmission based on the position information acquired from the destination in question. With any particular portion of each picture thus designated by users of different destinations for transmission at the reduced data compression rate in the moving picture streaming service, user preferences are adequately addressed.

The moving picture stream encoded at the high data compression rate is output commonly to a plurality of destinations. In turn, position information is acquired from each of the multiple destinations so that a desired partial region of each picture is designated accordingly for each destination. Video data representing the partial region are then encoded at high resolution before being transmitted to the respective destinations. This setup requires less transmission line occupancy than conventional arrangements wherein moving pictures are individually prepared and transmitted to a plurality of destinations. Reductions in line occupancy translate into higher levels of efficiency at which moving pictures are transmitted.

(3) Other Embodiments

The embodiments above were shown acquiring from a transmission destination the center coordinates of a partial picture region desired by the user in order to establish the picture region to be transmitted at high resolution. However, this is not limitative of the invention. An alternative embodiment of the invention may be arranged directly to accept the user's command for establishing the partial picture region.

The above embodiments were described as setting the partial picture region for high-resolution transmission in a uniquely defined fashion based on the position information acquired from the transmission destination. Alternatively, the position information acquired from the destination may be subjected to a peripheral feature extraction method or like process. When the nature or character of the target desired by the user is determined by such a method, the actual region for high-resolution transmission may be established accordingly. Other diverse techniques may also be resorted to in establishing the partial picture region to be transmitted at high resolution.

The above-described embodiments of the invention were shown transmitting a desired partial picture region for a predetermined period of time once the region is established for high-resolution transmission in accordance with the position information acquired from the transmission destination. Alternatively, a motion tracking technique or like process may be used to track the target in motion. This allows the partial picture region for high-resolution transmission to shift in position or be enlarged or contracted in area while the target is moving.

The embodiments above were shown stopping the high-resolution transmission immediately upon elapse of a predetermined period of time. However, this is not limitative of the invention. An alternative embodiment of the invention may be arranged to gradually end the high-resolution transmission by letting the reduced data compression rate return progressively to the high data compression rate for the general view transmission. This prevents an abrupt, awkward change of picture quality in the moving pictures being displayed on the receiving side.

The above embodiments were described as having the region extraction device and the frame memory 6 furnished separately. Alternatively, the frame memory 6 may be incorporated into the region extraction device.

In the above-described embodiments, the general view encoding device and high-resolution picture encoding device are furnished separately. In an alternative embodiment of the invention, the two encoding devices may be designed to share part of their components.

Whereas the embodiments above were shown adopting MPEG4 or like encoding methods for compressing general view video data for low-resolution general view transmission while encoding partial picture region data for high-resolution moving picture transmission, this is not limitative of the invention. Alternatively, many other data compression methods may be adopted for data compression and transmission.

Although the transmitting and receiving sides of each embodiment of the invention above were described as implemented on a hardware basis, this is not limitative of the invention. Alternatively, part or all of the transmitting and receiving sides may be implemented by software.

As described and according to the invention, general view video data are transmitted at a high data compression rate while a specific region of each picture defined as per the position information acquired from a transmission destination is transmitted at high resolution, i.e., at a reduced data compression rate. With any particular portion of each picture designated by individual users for high-resolution transmission at the reduced data compression rate in the moving picture streaming service, user preferences are adequately addressed.

As many apparently different embodiments of this invention may be made without departing from the spirit and scope thereof, it is to be understood that the invention is not limited to the specific embodiments thereof except as defined in the appended claims.

What is claimed is:

1. A picture transmission method for encoding moving picture data and transmitting the encoded data, the method comprising the steps of:
   encoding firstly said moving picture data into a moving picture stream for transmission at a predetermined data transfer rate; and
   encoding secondly, based on selected position information transmitted from each of a plurality of user devices, a part of said moving picture data of a higher resolution than said first encoding step; and
   transmitting said moving picture data of said first encoding step commonly to said plurality of devices while transmitting said moving picture data corresponding to the respective selected position information of said second encoding step, to each of said plurality of devices, wherein selected position information from a first of the plurality of user devices is different from selected position information from a second of the plurality of user devices, and wherein the second encoding step includes encoding the established partial picture regions for transmission at the higher resolution for a predetermined period of time, after which, encoding of the established partial picture regions at the higher resolution is halted after the selected position information has moved out of the partial picture region.

2. A method according to claim 1, further including, when the predetermined period of time has elapsed, gradually changing transmission of the data corresponding to the established partial picture region from the high resolution to the predetermined data transfer rate.

3. A method according to claim 1, wherein the encoding for transmission at the higher resolution for a predetermined period of time includes using a timer and discontinuing the second encoding step after the predetermined period of time has elapsed as determined using the timer.

4. A method according to claim 3, further including gradually returning transmission of data for the established partial picture region from the high resolution to the predetermined data transfer rate.

5. A picture transmission apparatus for encoding moving picture data and transmitting the encoded data, the apparatus comprising:

first encoding means for encoding said moving picture data into a moving picture stream for transmission at a predetermined data transfer rate; and second encoding means which, based on selected position information transmitted from each of a plurality of user devices, encodes a part of said moving picture data of a higher resolution than said first encoding means, wherein said moving picture data of said first encoding step is transmitted commonly to said plurality of devices while transmitting said moving picture data corresponding to the respective selected position information of said second encoding step, to each of said plurality of devices, wherein selected position information from a first of the plurality of user devices is different from selected position information from a second of the plurality of user devices, and wherein the second encoding means includes encoding the established partial picture regions for transmission at the higher resolution for a predetermined period of time, after which, encoding of the established partial picture regions at the higher resolution is halted after the selected position information has moved out of the partial picture region.

6. A picture transmission apparatus for encoding moving picture data and transmitting the encoded data, the apparatus comprising:

a first encoding device which encodes said moving picture data into a moving picture stream for transmission at a predetermined data transfer rate; and a second encoding device which, based on selected position information transmitted from each of a plurality of user devices, encodes a part of said moving picture data of a higher resolution than said first encoding device, wherein said moving picture data of said first encoding step is transmitted commonly to said plurality of devices while transmitting said moving picture data corresponding to the respective selected position information of said second encoding step, to each of said plurality of devices, wherein selected position information from a first of the plurality of user devices is different from selected position information from a second of the plurality of user devices, and wherein the second encoding device is configured to encode the established partial picture regions for transmission at the higher resolution for a predetermined period of time, after which, encoding of the established partial picture regions at the higher resolution is halted after the selected position information has moved out of the partial picture region.

7. An apparatus according to claim 6, wherein the transmission apparatus gradually ends transmission at the higher resolution to gradually return transmission of image data for said part of said moving picture data to the predetermined data transfer rate.

* * * * *